United States Patent
Jung et al.

(10) Patent No.: US 9,669,793 B2
(45) Date of Patent: Jun. 6, 2017

(54) AIRBAG FOR KNEE AIRBAG APPARATUS

(71) Applicant: AUTOLIV DEVELOPMENT AB, Vargarda (SE)

(72) Inventors: Doo Seob Jung, Hwaseong-si (KR); Do-Gwan Kim, Osan-si (KR)

(73) Assignee: AUTOLIVE DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/781,758

(22) PCT Filed: Mar. 28, 2014

(86) PCT No.: PCT/KR2014/002685
§ 371 (c)(1),
(2) Date: Oct. 1, 2015

(87) PCT Pub. No.: WO2014/168364
PCT Pub. Date: Oct. 16, 2014

(65) Prior Publication Data
US 2016/0046253 A1     Feb. 18, 2016

(30) Foreign Application Priority Data

Apr. 8, 2013  (KR) ........................ 10-2013-0038121

(51) Int. Cl.
*B60R 21/206*     (2011.01)
*B60R 21/231*     (2011.01)
(Continued)

(52) U.S. Cl.
CPC .......... *B60R 21/233* (2013.01); *B60R 21/206* (2013.01); *B60R 21/231* (2013.01);
(Continued)

(58) Field of Classification Search
CPC ... B60R 21/206; B60R 21/231; B60R 21/233; B60R 21/237; B60R 2021/23169;
(Continued)

(56) References Cited

U.S. PATENT DOCUMENTS 4,290,627 A * 9/1981 Cumming ............. B60R 21/233
                                                          280/729
5,306,043 A * 4/1994 Mihm ................... B60R 21/233
                                                          280/732
(Continued)

FOREIGN PATENT DOCUMENTS

JP     2003-237525 A     8/2003
JP     2007-203937 A     8/2007
(Continued)

OTHER PUBLICATIONS

International Search Report for PCT/KR2014/02675, ISA KR, Daejeon, mailed Aug. 13, 2014.
(Continued)

*Primary Examiner* — Laura Freedman
(74) *Attorney, Agent, or Firm* — Stephen T. Olson; Harness, Dickey & Pierce, P.L.C.

(57) ABSTRACT

An airbag for a knee airbag apparatus which is rapidly deployed upward along a shape of an instrument panel includes a front panel; and a rear panel coupled to the front panel to form an inflation chamber. The front panel neighbors to the instrument panel and the rear panel neighbors to knees of a passenger when the airbag is inflated. The rear panel includes a wrinkle portion which is deployed at a position corresponding to a housing connecting portion to which the instrument panel and a rear end of the housing neighbor when the airbag is inflated, so that an additional inflation chamber is formed.

15 Claims, 13 Drawing Sheets

(51) Int. Cl.
*B60R 21/233* (2006.01)
*B60R 21/2338* (2011.01)
*B60R 21/237* (2006.01)

(52) U.S. Cl.
CPC .. *B60R 21/237* (2013.01); *B60R 2021/23169* (2013.01); *B60R 2021/23308* (2013.01); *B60R 2021/23316* (2013.01); *B60R 2021/23382* (2013.01)

(58) Field of Classification Search
CPC    B60R 2021/23308; B60R 2021/23316; B60R 2021/23382
See application file for complete search history.

(56)     References Cited

U.S. PATENT DOCUMENTS

| | | | |
|---|---|---|---|
| 5,584,508 A * | 12/1996 | Maruyama | B60R 21/231 280/732 |
| 6,685,217 B2 * | 2/2004 | Abe | B60R 21/206 280/729 |
| 6,916,039 B2 * | 7/2005 | Abe | B60R 21/206 280/729 |
| 6,942,245 B2 * | 9/2005 | Takimoto | B60R 21/206 280/730.1 |
| 6,945,562 B2 | 9/2005 | Abe | |
| 7,182,365 B2 * | 2/2007 | Takimoto | B60R 21/206 280/730.1 |
| 7,207,594 B2 | 4/2007 | Igawa et al. | |
| 7,226,077 B2 * | 6/2007 | Abe | B60R 21/206 280/728.1 |
| 7,314,230 B2 * | 1/2008 | Kumagai | B60R 21/233 280/730.1 |
| 7,314,231 B2 * | 1/2008 | Abe | B60R 21/206 280/730.1 |
| 7,549,671 B2 | 6/2009 | Mizuno et al. | |
| 7,600,784 B2 * | 10/2009 | Kashiwagi | B60R 21/2171 280/729 |
| 7,758,067 B2 | 7/2010 | Narin et al. | |
| 7,766,374 B2 * | 8/2010 | Abele | B60R 21/206 280/730.1 |
| 7,819,420 B2 * | 10/2010 | Adachi | B60R 21/203 280/730.1 |
| 7,963,550 B2 | 6/2011 | Hong et al. | |
| 8,100,433 B2 | 1/2012 | Shimono | |
| 8,118,325 B2 * | 2/2012 | Enders | B60R 21/2338 280/730.1 |
| 8,302,991 B2 | 11/2012 | Hong et al. | |
| 8,444,177 B2 | 5/2013 | Wallat et al. | |
| 8,505,969 B2 | 8/2013 | Mendez | |
| 8,622,418 B2 | 1/2014 | Chun et al. | |
| 8,770,617 B2 * | 7/2014 | Abele | B60R 21/2338 280/730.1 |
| 8,960,713 B2 | 2/2015 | Kim et al. | |
| 9,022,416 B2 | 5/2015 | Wallat et al. | |
| 2003/0155759 A1 | 8/2003 | Abe | |
| 2005/0151351 A1 | 7/2005 | Enders et al. | |
| 2007/0182134 A1 | 8/2007 | Mizuno et al. | |
| 2008/0116669 A1 * | 5/2008 | Adachi | B60R 21/203 280/730.1 |
| 2009/0058052 A1 * | 3/2009 | Ford | B60R 21/206 280/730.1 |
| 2009/0085333 A1 * | 4/2009 | Imaeda | B60R 21/2032 280/730.1 |
| 2009/0134611 A1 | 5/2009 | Wigger et al. | |
| 2009/0152847 A1 | 6/2009 | Hong et al. | |
| 2011/0095512 A1 | 4/2011 | Mendez | |
| 2011/0101660 A1 | 5/2011 | Schneider et al. | |
| 2011/0109070 A1 | 5/2011 | Tanaka et al. | |
| 2011/0251039 A1 | 10/2011 | Hong et al. | |
| 2011/0260434 A1 * | 10/2011 | Gottschalk | B60R 21/206 280/730.2 |
| 2012/0025498 A1 | 2/2012 | Tanaka | |
| 2016/0052480 A1 | 2/2016 | Jung et al. | |
| 2016/0059815 A1 | 3/2016 | Jung et al. | |

FOREIGN PATENT DOCUMENTS

| | | |
|---|---|---|
| JP | 2011-136682 A | 7/2011 |
| KR | 2009-0065957 A | 6/2009 |

OTHER PUBLICATIONS

International Search Report and Written Opinion of the ISA, ISA/KR, Daejeon, mailed Aug. 13, 2014.

* cited by examiner

[Fig. 1]
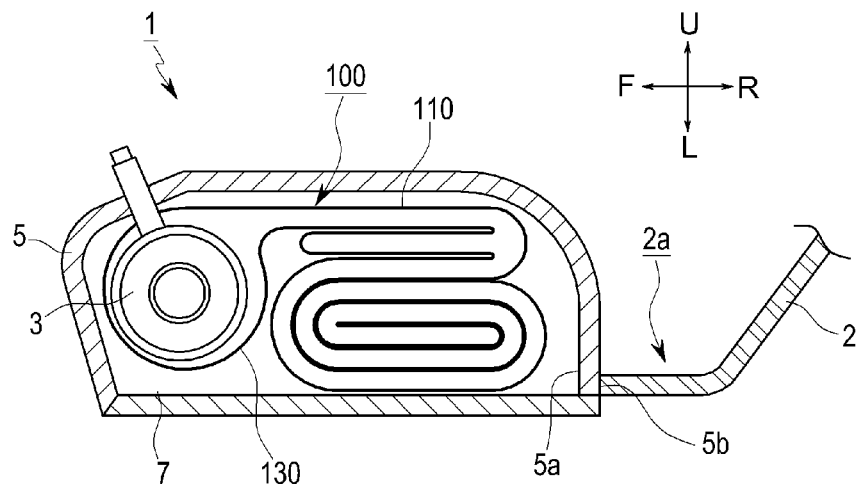
[Fig. 2]
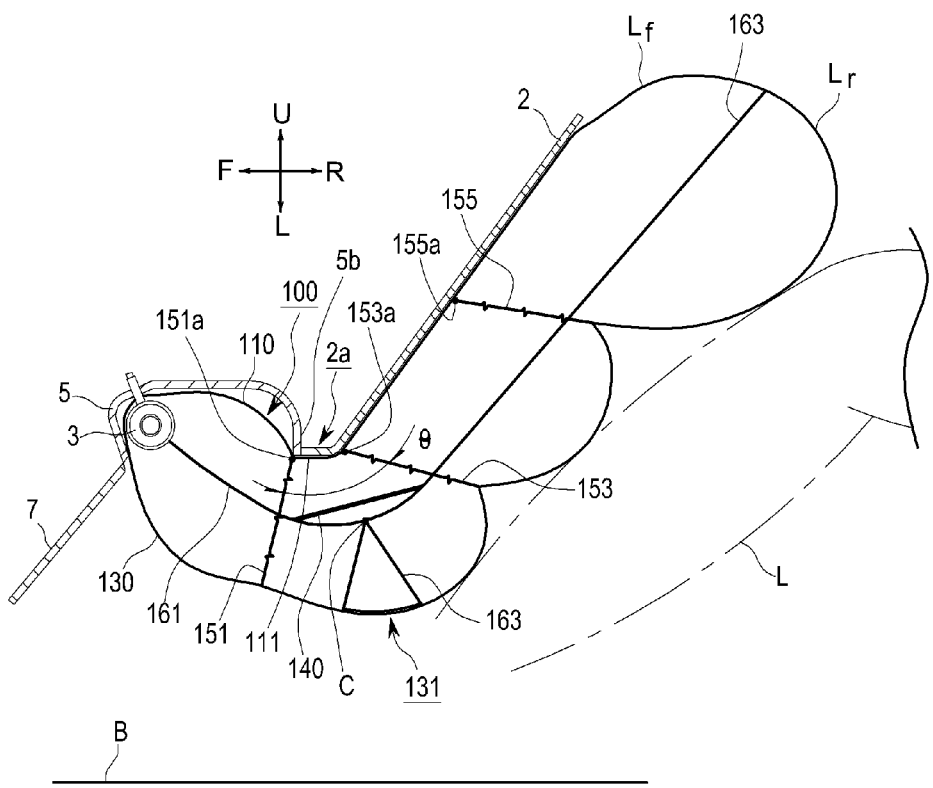

[Fig. 3]
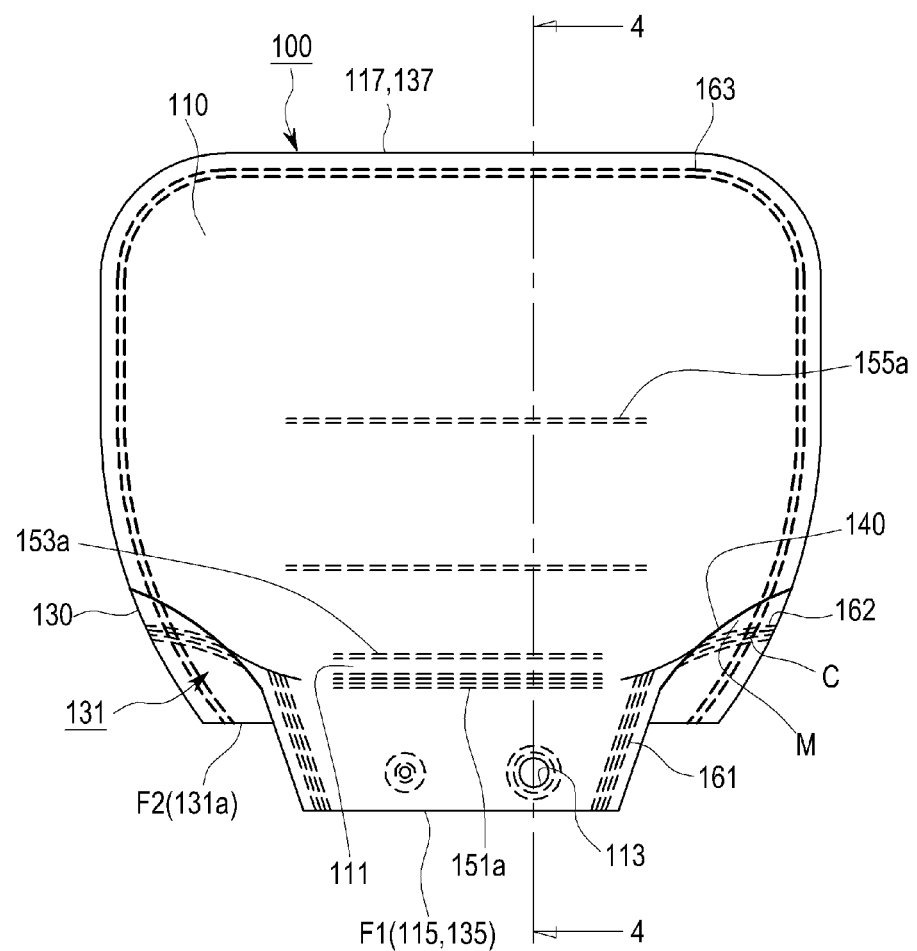

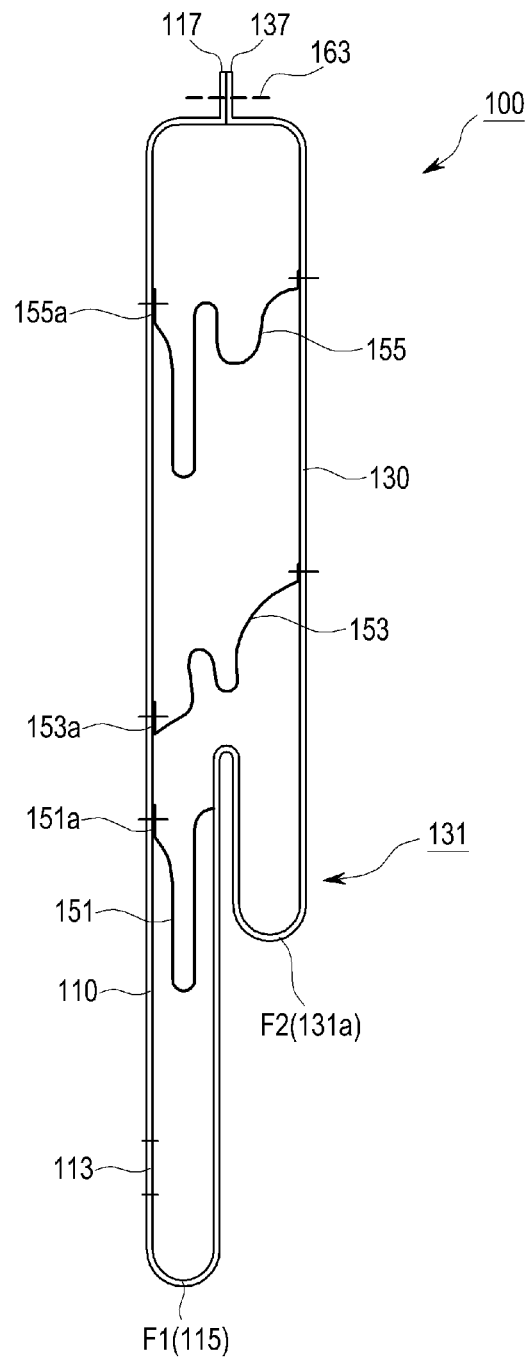
[Fig. 4]

[Fig. 5a]
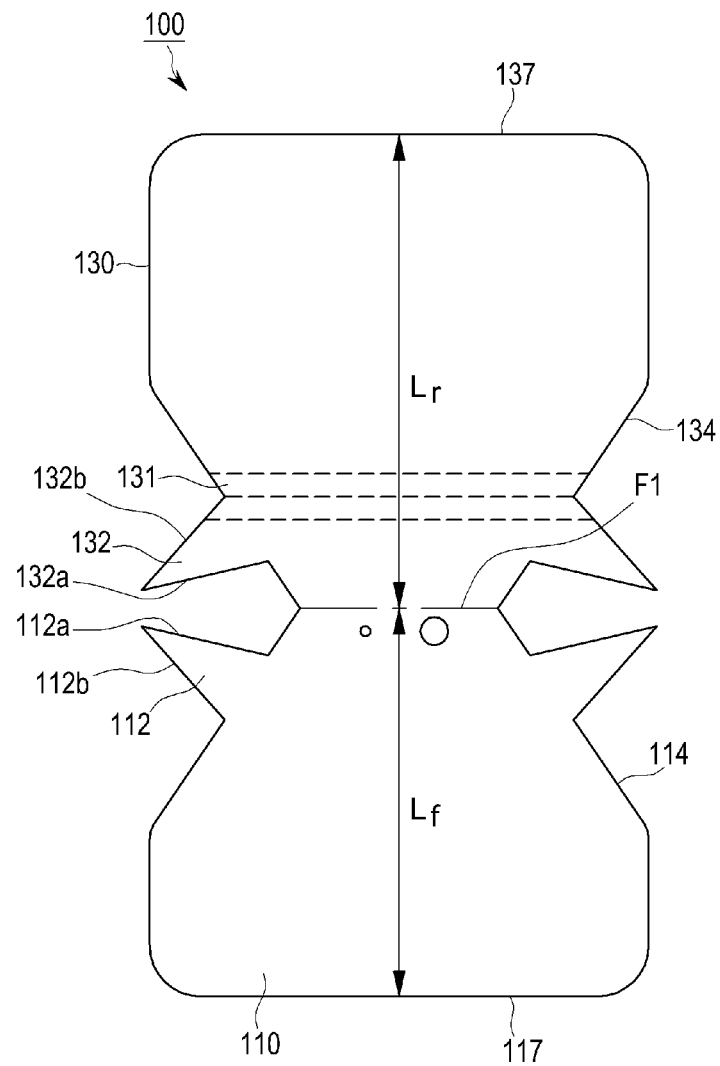

[Fig. 5b]
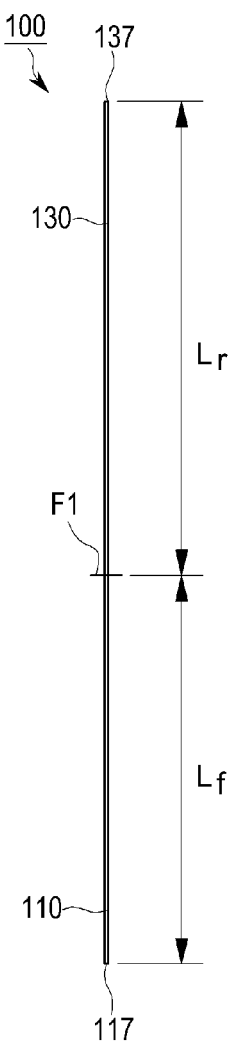

[Fig. 6a]
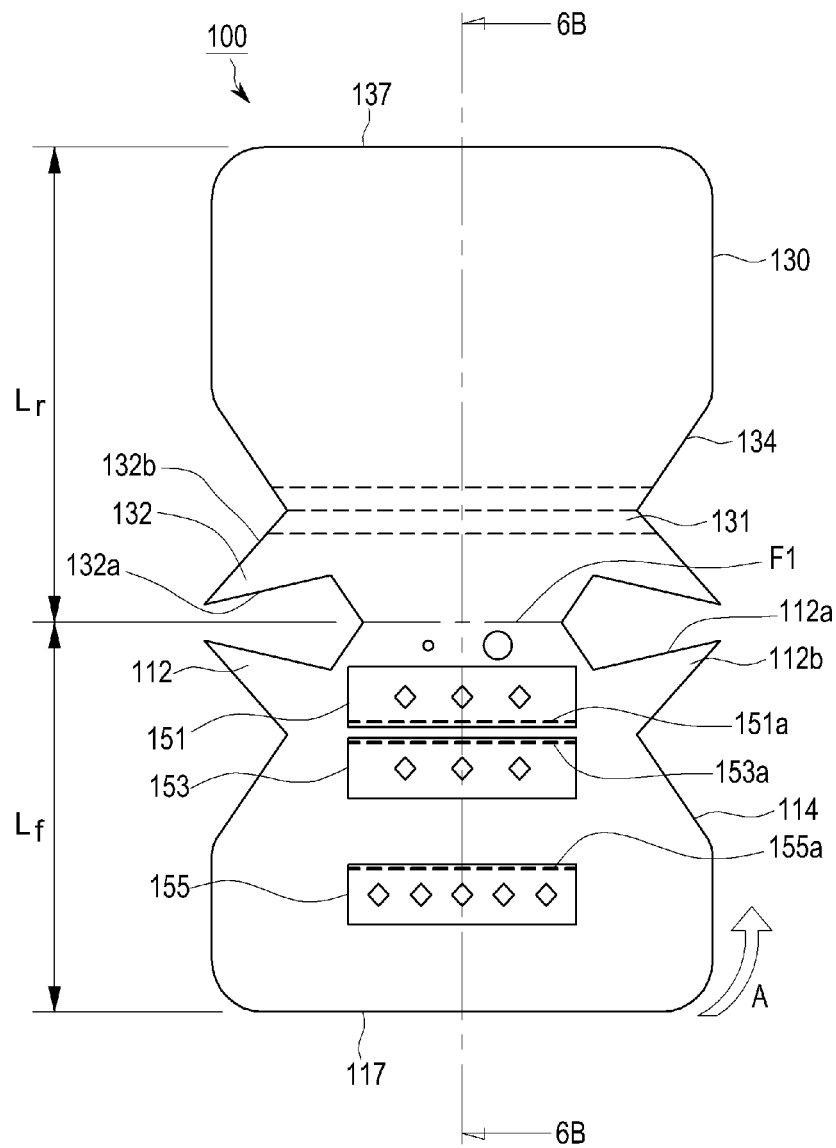

[Fig. 6b]
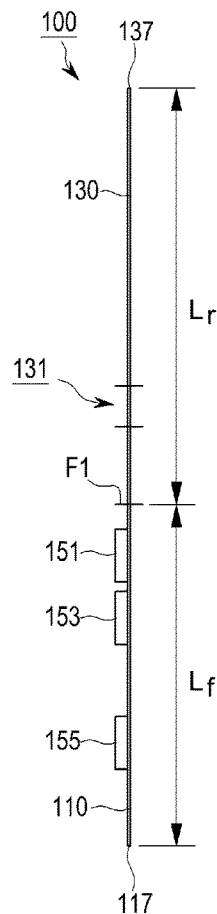
[Fig. 7a]
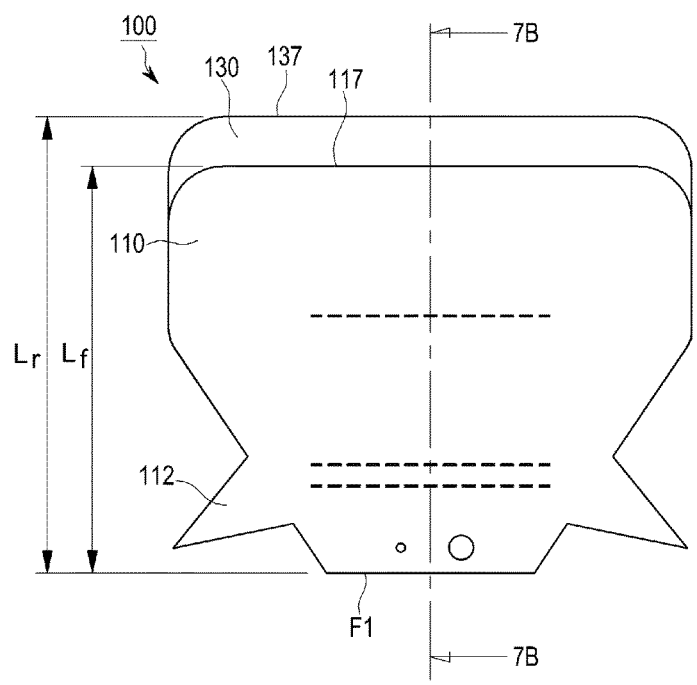

[Fig. 7b]
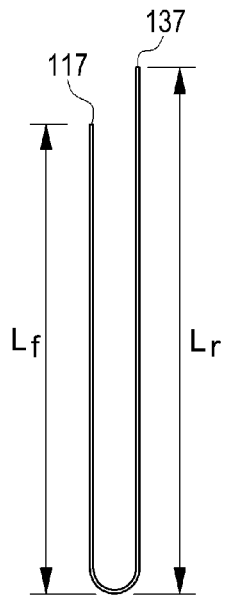
[Fig. 8a]
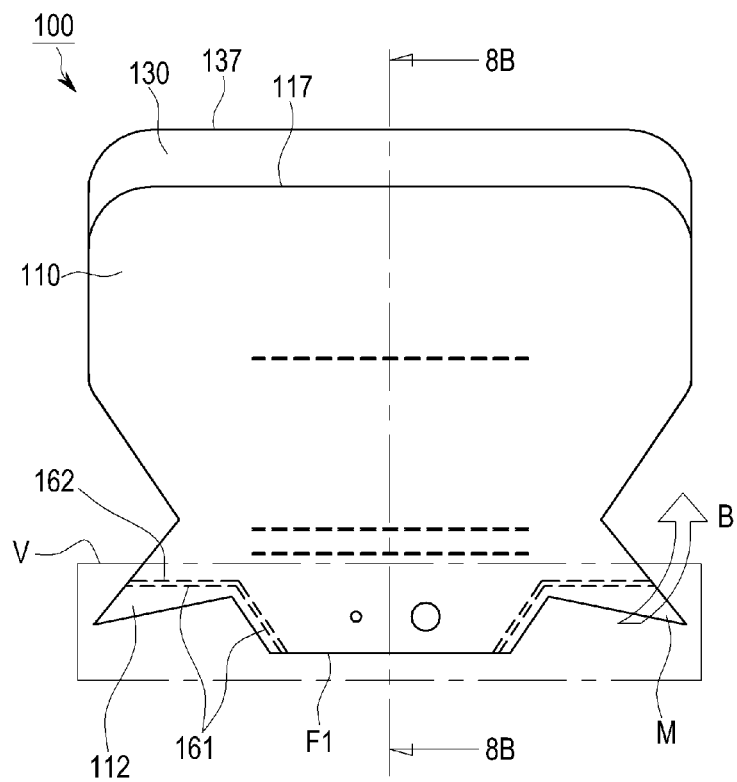

[Fig. 8b]
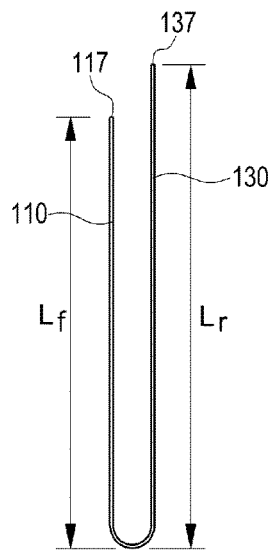
[Fig. 9a]
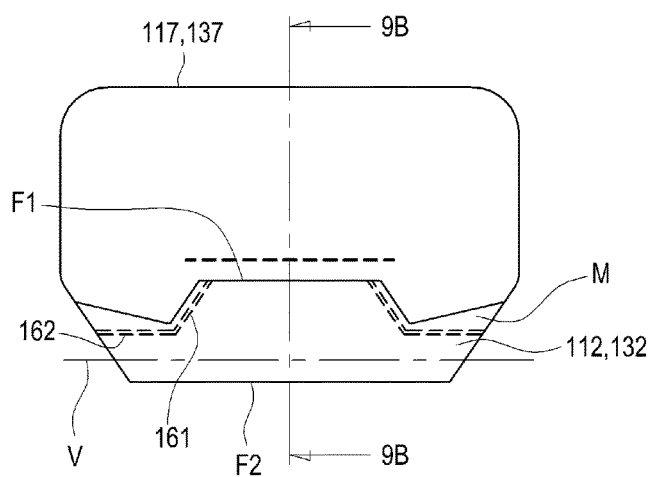
[Fig. 9b]
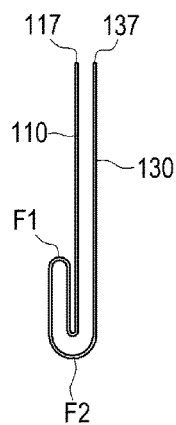

[Fig. 10a]
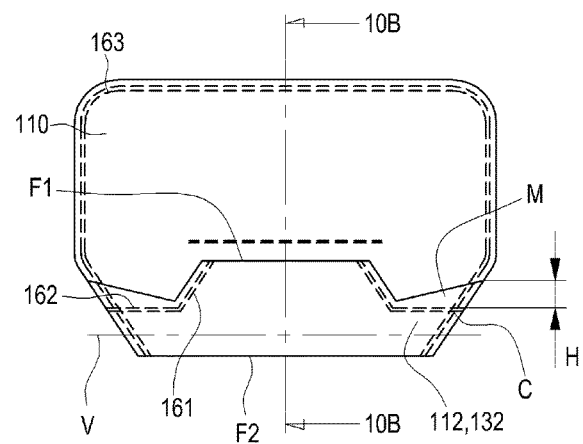
[Fig. 10b]
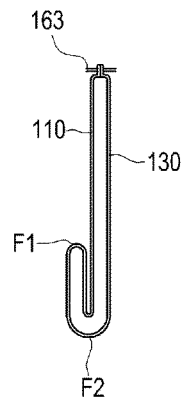
[Fig. 11a]
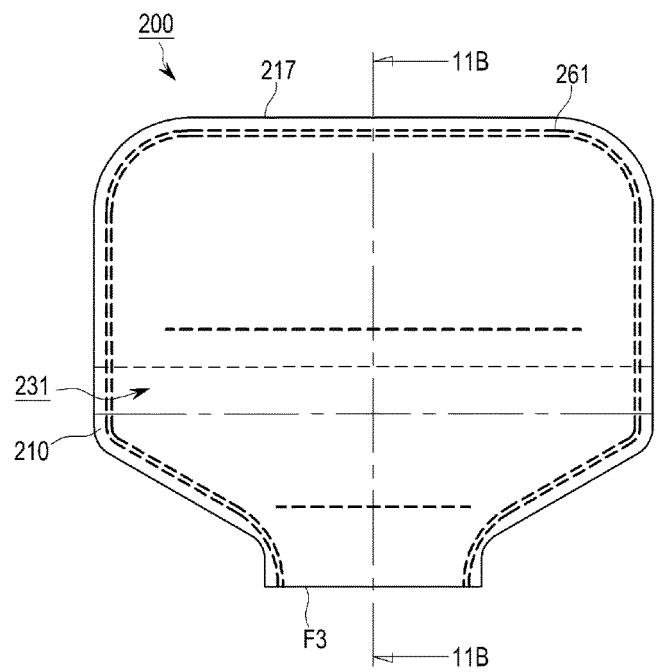

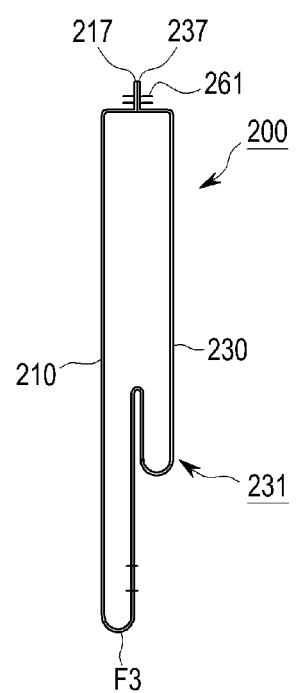
[Fig. 11b]

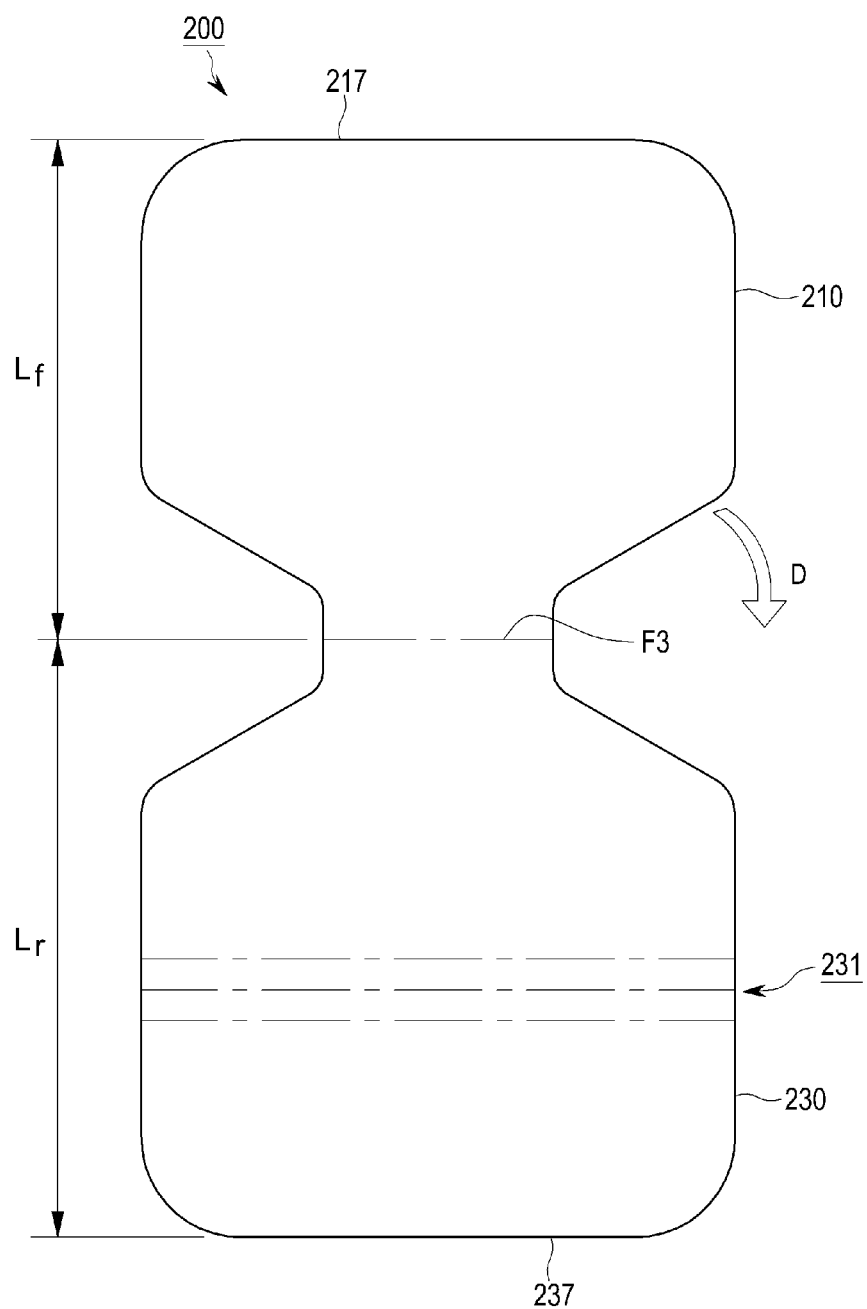
[Fig. 12]

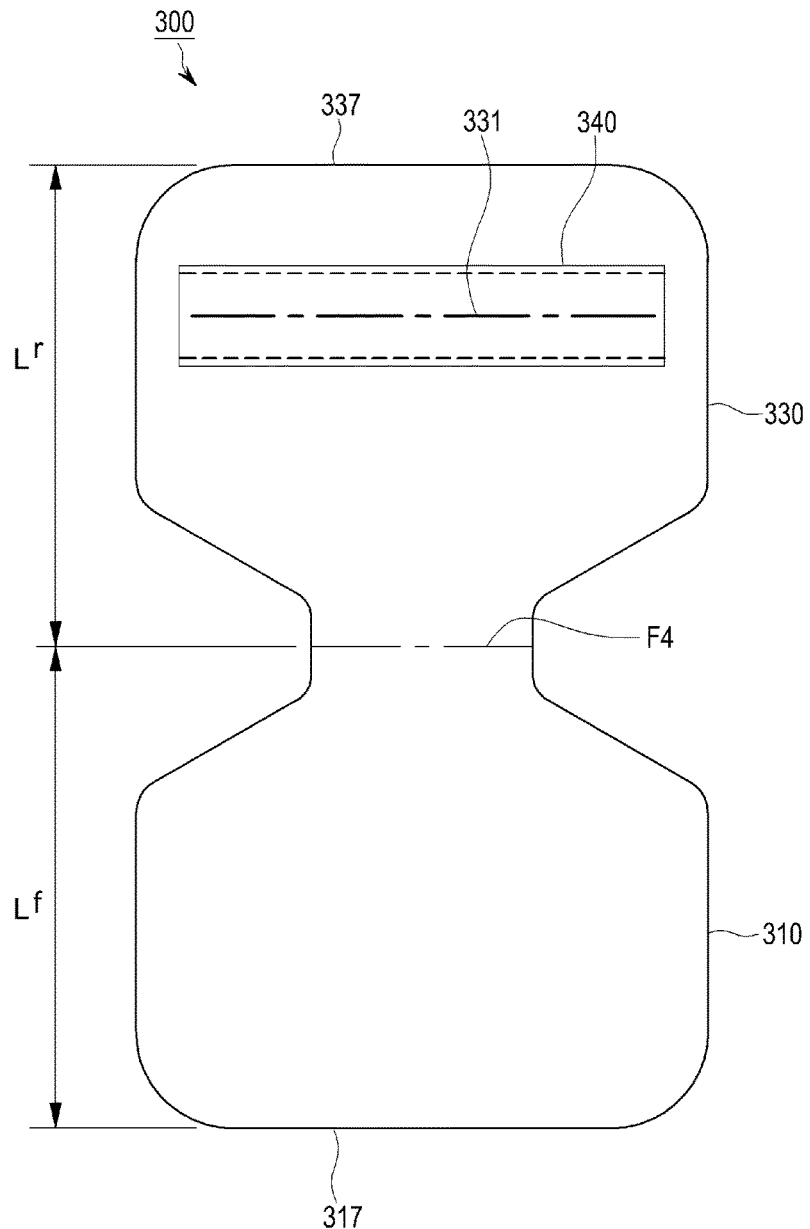
[Fig. 13]

AIRBAG FOR KNEE AIRBAG APPARATUS

CROSS-REFERENCE TO RELATED APPLICATIONS

This application is a 371 U.S. National Stage of International Application No. PCT/KR2014/002685, filed Mar. 28, 2014, which claims the benefit of Korean Patent Application No. 10-2013-00038121, filed Apr. 8, 2013. The entire disclosures of the above applications are incorporated herein by reference.

TECHNICAL FIELD

The present invention relates to a knee airbag apparatus. More particularly, the present invention relates to an airbag for a knee airbag apparatus which is manufactured to allow a rear panel of the airbag to have a length longer than that of a front panel, so that the airbag deploys upward along an instrument panel.

BACKGROUND ART

A knee airbag apparatus protects legs of a passenger upon a collision by deploying an airbag between an instrument panel and the lower legs, for example, tibias of the passenger.

The airbag prevents a passenger from colliding with the instrument panel at a high acceleration upon a vehicle collision. The instrument pane is made of a high stiffness material so a high force is applied to the legs of the passenger when the passenger collides with the instrument panel at a high acceleration.

The airbag allows the passenger to collide with the airbag instead of the components of a vehicle, so that relatively low impact is applied to the passenger.

The knee airbag apparatus, which is located behind the instrument panel, is configured to be deployed through a door or chute placed on a surface of the instrument panel.

To the contrary, the knee airbag apparatus, which is installed at a low portion of the instrument panel, is deployed toward the bottom of the vehicle at the first stage, and then, is deployed upward along the instrument panel of the vehicle (this knee airbag apparatus is called a low mounting knee airbag apparatus).

Thus, the study and research have been performed on various deployment paths of the knee airbag apparatus for effectively deploying the airbag of the knee airbag apparatus toward an upper portion of a vehicle along a shape of an instrument panel.

(Patent document 1) U.S. Patent publication No. 2012/0025498 A1

DISCLOSURE OF INVENTION

Technical Problem

Accordingly, it is an object of the present invention to provide an airbag for a knee airbag apparatus in which, when the airbag is deployed, an airbag is deployed more rapidly toward an upper portion of a vehicle by inducing the airbag to be stood near a portion at which a housing and an instrument panel are coupled to each other.

Further, it is another object of the present invention to provide an airbag for a knee airbag apparatus which utilizes a margin generated in fabricating an airbag without employing an additional member as a deployment guide member for inducing an airbag deployment upward.

Solution to Problem

According to the present invention, there is provided an airbag for a knee airbag apparatus. The airbag for a knee airbag apparatus includes a front panel; and a rear panel coupled to the front panel to form an inflation chamber, wherein the front panel neighbors to the instrument panel and the rear panel neighbors to knees of a passenger when the airbag is inflated, and the rear panel includes a wrinkle portion which is deployed at a position corresponding to a housing connecting portion to which the instrument panel and a rear end of the housing neighbor when the airbag is inflated, so that an additional inflation chamber is formed.

The front and rear panels are fabricated as one piece such that the front and rear panels face each other about a first folding line, a vertical length from the first folding line to an upper end of the front panel is shorter than a length from the first folding line to an upper end of the rear panel, the front and rear panels include a front inclined end and a rear inclined end, respectively, which are gradually inclined outward from the first folding line to upper ends of the front and rear panels, and the front and rear panels include front and rear flaps protruding outward from the front and rear inclined ends and symmetrical to each other about the first folding line.

The front and rear flaps include lower ends placed in the front and rear panels when the front and rear flaps are folded in a horizontal direction at a position spaced apart from the first folding line; and side ends corresponding to the front and rear inclined ends.

The airbag includes a first sewing line for sewing lower portions of the front and rear panels folded about the first folding line; a second sewing line connected to the first sewing line for sewing lower ends of the front and rear flaps; and a third sewing line formed by sewing the front and rear panels along peripheries of the front and rear panels after lower portions of the front and rear panels sewed along the first and second sewing lines are folded onto a top surface of the front panel and upper ends of the front and rear panels are aligned to each other to form a second folding line.

The first sewing line is sewed in parallel with the first folding line, such that the first sewing line crosses the third sewing line.

The front and rear panels are fabricated as one piece such that the front and rear panels face each other about a folding line, a vertical length from the folding line to an upper end of the front panel is shorter than a vertical length from the folding line to an upper end of the rear panel, the wrinkle portion is implemented by folding a lower portion of the rear panel to allow an upper end of the front panel to be aligned with an upper end of the rear panel, and both sides of the wrinkle portion are fixed by a sewing line formed along peripheries of the front and rear panels.

The front panel has a vertical length equal to a vertical length of the rear panel, and the rear panel includes a cutting line formed in a horizontal direction and an additional panel connected to a periphery of the cutting line to form the wrinkle portion.

When the airbag is inflated, the airbag is initially deployed toward a bottom of the vehicle and then deployed upward between the instrument panel and the knee of the passenger.

Advantageous Effects of Invention

As described above, according to the present invention, the airbag of the low mounting knee airbag apparatus includes a deployment plane concaved toward a position corresponding to the connecting portion between the instrument panel and the housing, so that the upward deployment of the airbag can be rapidly induced.

According to the present invention, the airbag of the low mounting knee airbag apparatus can induce the upward deployment of the airbag by using the margin and the sewing lines of the front and rear panels.

In addition, the number of components and the fabrication cost can be reduced, the fabrication method can be simplified, and the airbag which induces the airbag to be effectively stood upward can be fabricated.

BRIEF DESCRIPTION OF DRAWINGS

FIG. 1 is a longitudinal sectional view showing a folded state of an airbag of a knee airbag apparatus according to an embodiment of the present invention;

FIG. 2 is a longitudinal sectional view showing an inflated state of an airbag of a knee airbag apparatus according to an embodiment of the present invention;

FIG. 3 is a front view showing a non-inflated state of an airbag of a knee airbag apparatus according to an embodiment of the present invention;

FIG. 4 is a sectional view taken along the line 4-4 of FIG. 3;

FIG. 5a is an unfolded front of the airbag of FIG. 3;

FIG. 5b is an unfolded side view of the airbag of FIG. 3;

FIG. 6a is a development view of the airbag of FIG. 3;

FIG. 6b is a sectional view taken along line 6b-6b of FIG. 6a;

FIG. 7a is a development view showing a state of connecting a tether to a front panel of an airbag according to an embodiment of the present invention;

FIG. 7b is a sectional view taken along line 7b-7b of FIG. 7a;

FIG. 8a is a view showing a state of folding a front panel along arrow A about the first folding line F1 of FIG. 7a;

FIG. 8b is a sectional view taken along line 8b-8b of FIG. 8a;

FIG. 9a is a view showing a state of coupling low portions of the front and rear panels according to an embodiment of the present invention;

FIG. 9b is a sectional view taken along line 9b-9b of FIG. 9a;

FIG. 10a is a view showing a state of adjusting positions of top ends of the front and rear panels in a state of folding low portion of the front and rear panels along arrow B about a virtual line V of FIG. 9a;

FIG. 10b is a sectional view taken along line 10b-10b of FIG. 10a;

FIG. 11a is a view showing a state of sewing peripheries of the front and rear panels of the airbag according to an embodiment of the present invention;

FIG. 11b is a sectional view taken along line 11b-11b of FIG. 11a.

FIG. 12 is a view similar to FIG. 5a showing another airbag according to the present invention; and FIG. 13 is another view similar to FIG. 5a showing another airbag according to the present invention.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the following description, directional terms described below, such as "upper direction", "lower direction", "forward direction", and "rearward direction", will be defined based on an airbag housing in a state that the airbag housing is coupled to a low portion of an instrument panel. That is, a direction toward the roof of a vehicle is defined as an upper direction (U), a direction toward the bottom of a vehicle is defined as a lower direction (L), a direction toward a passenger is defined as a rearward direction (R), and a direction toward a front of a vehicle is defined as a forward direction (F).

FIG. 1 is a longitudinal sectional view showing a folded state of an airbag of a knee airbag apparatus according to an embodiment of the present invention.

Referring to FIGS. 1 and 2, the knee airbag apparatus 1 is installed at a low portion of an instrument panel 2.

The Knee airbag apparatus 1 includes an airbag 100, an inflator for supply gas to the airbag 100 upon collision of a vehicle, an airbag housing 5 for receiving the airbag 100 and the inflator 3, and a door 7 for covering an opening 5a in the airbag housing 5.

The airbag 100 includes a front panel 110 which neighbors on the instrument panel 2 and a rear panel 130 which neighbors on low legs L of a passenger when the airbag 100 is inflated.

A vertical length Lf of the front panel 130 is shorter than a length Lr of the rear panel 130. Thus, when the front and rear panels 110 and 130 are coupled correspondingly to each other, a wrinkle portion 131, which is unfolded out when inflating the airbag, is formed at the rear panel 130.

The wrinkle portion 131 is formed at a low portion of the rear panel 130 in a horizontal direction such that the wrinkle portion 131 is unfolded near a housing connecting portion 2a to which the housing 5 and the instrument panel 2 are coupled.

A plurality of tethers (for example, first to third tethers 151 to 155) are connected between the front and rear panels 110 and 130 and are spaced apart from each other by a predetermined gap such that the forward and rearward deployments of the airbag 110 may be restrained.

Preferably, when the airbag 100 is inflated, the first tether 151 is unfolded from a portion 2a (hereinafter, referred to as housing connecting portion) to which a rear end 5a of the housing 5 and the instrument panel 2 neighbor, toward the bottom of the vehicle in a substantially vertical direction, and the second tether 153 is unfolded from the portion 2a (hereinafter, referred to as housing connecting portion) to which the rear end 5a of the housing 5 and the instrument panel 2 neighbor, toward a low legs L of a passenger in a horizontal direction.

That is, one end of the first tether 151 may be coupled to one position of the front panel 110 corresponding to a front end of the housing connecting portion 2a through a first tether sewing line 151a, and one end of the second tether 153 may be coupled to another position of the front panel 110 corresponding to a rear end of the housing connecting portion 2a spaced apart from the first tether sewing line 151a by a predetermined distance.

A middle portion 111 of the front panel 110 which is connected between the first and second tethers 151 and 152 as described above performs a function of a hinge portion of deploying the airbag 100 upward and slope-wise along the shape of the instrument panel 2.

Reference numeral 155a denotes a third tether sewing line which allows the third tether 155 to be coupled to the front panel 110.

The knee airbag apparatus 1 may be a low mounted knee airbag apparatus which is installed at a low portion of the instrument panel 2 of driver and passenger seats to allow the airbag 100 to be deployed upward after the airbag 100 is initially deployed toward the bottom of the vehicle.

In addition, the knee airbag apparatus 1 may be installed below a steering wheel at a driver side or at various positions such as a rear side of the vehicle.

FIG. 3 is a perspective view showing a deployment state of the knee airbag apparatus according to an embodiment of the present invention. FIG. 4 is a sectional view taken along line 4-4 of FIG. 3.

Referring to FIGS. 3 and 4, the airbag 100 includes a front panel 110 having an inflator insertion hole 113 and a rear panel 130 having a shape corresponding to the front panel 110 and the wrinkle portion 131 formed by folding a portion of a low portion thereof in a horizontal direction.

The front and rear panels 110 and 130 are formed of one piece by folding the one piece having a substantially corresponding shape about a first folding line F1 in a central portion of them.

The first folding line F1 corresponds substantially to low ends 115 and 135 of the front and rear panels 110 and 130.

The airbag 100 includes a firs sewing line 161 formed by sewing low portions of the front and second panels 110 and 130 which are overlapped by folding the front and second panels 110 and 130 about the first folding line F1, and a second sewing line 162 which extends from the first sewing line 161 and is formed by sewing the front and rear panels 110 and 130 in parallel with the first folding line F1.

In the airbag 100, the firs folding line F1 is positioned on the top surface of the front panel 110 by folding the low portions of the front and rear panels 110 and 130 upward to the front panel 110, the second folding line F2 is formed in the rear panel 130 by fitting the upper end of the rear panel 130 to the upper end of the front panel 110, and then, a third sewing line 163 is formed by sewing the front and rear panel 110 and 130 along peripheries of the front and rear panel 110 and 130.

The second folding line F2 corresponds substantially to a low end 131a of the wrinkle portion 131 of the rear panel 130.

A cross point C is formed at a position corresponding to that of the wrinkle portion 131 by crossing the second and third sewing lines 162 and 163. The cross point C performs a function of a hinge point of guiding the airbag 100 to be deployed upward according to the shape of the instrument panel 2 when the airbag 100 is inflated (referring to FIG. 2).

A deployment guide member 140, which guides the airbag 100 to be stood upward, may be additionally provided on a portion at which the second sewing line 162 of the front and rear panels 110 and 130 are formed.

The deployment guide member 140 may be implemented by using the seam margin M formed at a portion, on which the second sewing line 162 of the front and rear panels 110 and 130 is formed.

Hereinafter, a method, which fabricates the airbag of the knee airbag apparatus configured above, will be described in more detail.

FIGS. 5a to 10b are views showing a process of fabricating an airbag of a low mounting airbag apparatus according to an embodiment of the present invention. The tethers will be omitted from each sectional view.

In the following description, the directional terms, such as "upper end", "lower end", "vertical direction", "horizontal direction" and the like will be defined as follows. In detail, in a state that the non-inflated airbag is unfolded on a plane, a portion adjacent to a portion connected to an inflator is defined as a lower portion, an end of the lower portion is defined as a lower end, a portion facing the lower portion is defined as an upper portion, an end of the upper portion is defined as an upper end, a direction parallel with the upper end of the airbag is defined as a horizontal direction, and a direction perpendicular to the horizontal direction is defined as a vertical direction.

Referring to FIGS. 5a and 5b, the front and rear panels 110 and 130 constituting the airbag 100 are formed of one piece by folding the one piece about the first folding line F1 provided at the substantially central portion of the front and rear panels 110 and 130

The front panel 110 has a vertical length Lf from the first folding line F1 to the top end of the front panel 110, and the rear panel 130 has a vertical length Lr from the first folding line F1 to the top end 137 of the rear panel 130.

The vertical length Lr of the rear panel 130 is longer than the vertical length Lf of the front panel 110 so that the rear panel 130 has the wrinkle portion 131.

The front and rear panels 110 and 130 have a front inclined end 114 and a rear inclined end 134 which are gradually inclined upward at low edges of them. Therefore, the front and rear panels 110 and 130 are substantially formed in a trapezoid shape.

The front and rear panels 110 and 130 include front and rear flaps 112 and 132 which are protruded from the front and rear inclined ends 114 and 134 to an outside and are symmetrical to each other about the first folding line F1.

The front and rear flaps 112 and 132 include low ends 112a and 132a placed in the front and rear panels 110 and 130 when the front and rear panels 110 and 130 are folded at a place spaced apart from the first folding line F1 by a predetermined distance, and side ends 112b and 132b corresponding to the front and rear inclined ends 114 and 134.

Preferably, the low ends 112a and 132a of the front and rear flaps 112 and 132 are formed to be inclined toward the upper ends of the front and rear panels 110 and 130.

Referring to FIGS. 6a and 6b, ends of the first to third tethers 151, 153 and 155 are connected to inner surfaces of the front and rear panels 110 and 130 through the first to third tether sewing lines 151a, 153a and 155a.

Although the state of connecting the first to third tethers 151, 153 and 155 to the front panel 110 is only shown in the drawings for easy description, the opposite ends of the first to third tethers 151, 153 and 155 are connected to the rear panel 130 in a similar manner.

Referring to FIGS. 7a and 7b, the front panel 110 overlaps the rear panel 130 by folding the front panel 110 on the inner surface of the rear panel 130 along arrow A with respect to the first folding line F1, so that the front and rear flaps 112 and 132 are overlapped.

The vertical length Lr of the rear panel 130 is longer than the vertical length Lf of the front panel 110, so that the top end 137 of the rear panel 130 is located at a higher position than that of the top end 117 of the front panel 110.

Referring to FIGS. 8a and 8b, both sides of the low portions of the front and rear panels 110 and 130 overlapped through the first sewing line 161 are connected to each other, and the second sewing line 162 extending from the first sewing line 161 is formed in the front and rear flaps 112 and 132 so that the front and rear flaps 112 and 132 are combined with each other. The second sewing line 162 is formed in parallel with the first folding line F1 substantially in a horizontal direction.

Continuously, the low portions of the front and rear panels 110 and 130 are folded in the direction of arrow B with respect to a virtual line V denoted over the second sewing line 162, so that the first folding line F1 is placed on the external top surface of the front panel 110.

Referring to FIGS. 9a and 9b, in the state that the low portions of the front and rear panels 110 and 130 are folded with respect to the virtual line V, the rear panel 130 is allowed to move such that the top end 117 of the front panel 110 corresponds to the top end 137 of the rear panel 130.

Thus, the rear panel 130 is folded under the virtual line V so that the second folding line 130 is formed. The second folding line F2 serves as the bottom end 131a of the wrinkle portion 131 shown in FIG. 4.

Referring to FIGS. 10a and 10b, the third sewing line 163 is formed by sewing them from one side of the second folding line F2 to on opposite side of the second folding line F2 along the edges of the front and rear panels 110 and 130.

The cross point C is formed by crossing the third sewing line 163 and the second sewing line 162 formed at the front and rear flaps 112 and 132, so that the third sewing line 163 performs the function of a hinge for guiding the airbag 100 to allow the airbag 100 to be deployed upward when the airbag 100 is inflated.

The margin M extends toward the top ends of the front and rear panels 110 and 130 so that the bottom ends of the front and rear flaps 112 and 132, in which the second sewing line 162 is formed. The margin M extends from the cross point C at which the first and third sewing lines 162 and 163 are crossed, by a predetermined length H.

Therefore, when the airbag 100 is inflated, the margin M pulls the airbag 100 toward the instrument panel 2, the margin M performs a function of the deployment guide member of guiding the airbag 100 to be deployed rapidly and upward.

FIG. 11a is a front view showing an airbag according to another embodiment of the present invention. FIG. 11b is a sectional view taken along line 11b-11b of FIG. 11a.

Referring to FIGS. 11a and 11b, an airbag 200 includes a front panel 210 and a rear panel 230 having a wrinkle portion 231.

Both sides of the wrinkle portion 231 are fixed through a sewing line 261 formed by sewing the front and rear panels 210 and 230 along peripheries of the front and rear panels 210 and 230 after overlapping the front and rear panels 210 and 230.

FIG. 12 is a development view of the airbag 200.

Referring to FIG. 12, the airbag 200 includes the front and rear panel 210 and 230 formed of one piece by folding the one piece having a substantially corresponding shape about a folding line F3 in a central portion thereof.

The vertical length Lr from the folding line F3 to the top end 237 of the rear panel 230 is longer than the vertical length Lf from the folding line F3 to the top end 217 of the front panel 210.

A portion 231 of the rear panel 230 of the airbag 200 is folded in zigzag to form the wrinkle portion 231, and a sewing line 261 is formed by sewing the front and rear panels 210 and 230 along the peripheries of the front and rear panels 210 and 230 after the front and rear panels 210 and 230 are overlapped by folding the front panel 210 in the direction of arrow D.

The sewing line 261 is formed by simultaneously sewing both sides of the wrinkle portion 231 so that both sides of the wrinkle portion 231 are fixed.

FIG. 13 is a development view showing a knee airbag according to still another embodiment of the present invention.

Referring to FIG. 13, the airbag 300 includes the front and rear panel 310 and 330 formed of one piece by folding the one piece having a substantially corresponding shape about a folding line F3 in a central portion thereof.

The vertical length Lr from the folding line F3 to the top end 237 of the rear panel 230 is equal to the vertical length Lf from the folding line F3 to the top end 217 of the front panel 210.

A cutting line 331 is formed in the rear panel 330 in a horizontal direction and an additional panel 340 is coupled to the rear panel 330 around the cutting line 331.

A wrinkle portion is formed in the additional panel 340 in the state that the airbag 300 is folded, and an inflation gas, which is provided into the airbag 300 when the airbag 300 is inflated, is exhausted through the cutting line 331, so that the additional panel 340 is additionally inflated by the exhaust pressure. Thus, the deployment length of the rear panel 330 is substantially longer than the deployment length of the front panel 310.

As a result, the time taken to apply tension to the front panel 310 is shorter than the time taken to apply tension to the rear panel 330, so that the airbag is rapidly deployed toward the upper portion of the vehicle along the shape of the instrument panel.

The wrinkle portion formed by the additional panel 340 may be in the state that the wrinkle portion is inserted into the airbag 300 while being folded. To the contrary, the wrinkle portion may be in the state that the wrinkle portion is drawn out of the rear panel 330 through the cutting line 331.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An airbag for a knee airbag apparatus which is received in a housing coupled to an instrument panel of a vehicle and inflatable in the housing, the airbag comprising:
   a front panel;
   a rear panel coupled to the front panel to form an inflation chamber, the rear panel including a wrinkle portion; and
   a first tether having a first end secured to the front panel and a second end secured to the rear panel at an innermost layer of the wrinkle portion;
   wherein the front panel is adapted to deploy adjacent the instrument panel and the rear panel is adapted to deploy adjacent knees of a passenger when the airbag is inflated, and the rear panel includes a wrinkle portion which is deployed at a position corresponding to a housing connecting portion to which the instrument panel and a rear end of the housing neighbor when the airbag is inflated, so that an additional inflation chamber is formed;
   wherein a vertical length of the front panel is shorter than a length of the rear panel such that when the front and rear panels are coupled correspondingly to each other, the wrinkle portion, which is unfolded out when inflating the airbag, is formed at the rear panel; and wherein the rear panel in an uninflated state includes upper and lower portions defined by a single layer of material and the wrinkle portion, the wrinkle portion disposed between the upper and lower portions and folded so as to be defined by three layers of material.

2. The airbag of claim 1, wherein the front and rear panels are fabricated as one piece such that the front and rear panels face each other about a folding line, a vertical length from the folding line to an upper end of the front panel is shorter than a vertical length from the folding line to an upper end of the rear panel, the wrinkle portion is implemented by folding a lower portion of the rear panel to allow an upper end of the front panel to be aligned with an upper end of the rear panel, and both sides of the wrinkle portion are fixed by a sewing line formed along peripheries of the front and rear panels.

3. The airbag of claim 1, wherein, when the airbag is inflated, the airbag is initially deployed toward a bottom of the vehicle and then deployed upward between the instrument panel and the knees of the passenger.

4. The airbag of claim 1, further comprising second and third tethers both having a first end secured to the front panel and a second end secured to the rear panel at the upper portion.

5. The airbag of claim 1, in combination with the housing, the housing defining a corner adjacent an opening thereof, the first tether secured to the front panel at a location proximate the corner when the airbag is deployed.

6. An airbag for a knee airbag apparatus which is received in a housing coupled to an instrument panel of a vehicle and inflatable in the housing, the airbag comprising:
   a front panel; and
   a rear panel coupled to the front panel to form an inflation chamber,
   wherein the front panel is adjacent to the instrument panel and the rear panel is adjacent to knees of a passenger when the airbag is inflated, and the rear panel includes a wrinkle portion which is deployed at a position corresponding to a housing connecting portion to which the instrument panel and a rear end of the housing neighbor when the airbag is inflated, so that an additional inflation chamber is formed; and
   wherein the front and rear panels are fabricated as one piece such that the front and rear panels face each other about a first folding line, a vertical length from the first folding line to an upper end of the front panel is shorter than a length from the first folding line to an upper end of the rear panel, the front and rear panels include a front inclined end and a rear inclined end, respectively, which are gradually inclined outward from the first folding line to upper ends of the front and rear panels, and the front and rear panels include front and rear flaps protruding outward from the front and rear inclined ends and symmetrical to each other about the first folding line.

7. The airbag of claim 6, wherein the front and rear flaps include:
   lower ends placed in the front and rear panels when the front and rear flaps are folded in a horizontal direction at a position spaced apart from the first folding line; and
   side ends corresponding to the front and rear inclined ends.

8. The airbag of claim 7, wherein the airbag includes:
   a first sewing line for sewing lower portions of the front and rear panels folded about the first folding line;
   a second sewing line connected to the first sewing line for sewing lower ends of the front and rear flaps; and
   a third sewing line formed by sewing the front and rear panels along peripheries of the front and rear panels after lower portions of the front and rear panels sewed along the first and second sewing lines are folded onto a top surface of the front panel and upper ends of the front and rear panels are aligned to each other to form a second folding line.

9. The airbag of claim 8, wherein the first sewing line is sewed in parallel with the first folding line, such that the first sewing line crosses the third sewing line.

10. An airbag for a knee airbag apparatus which is received in a housing coupled to an instrument panel of a vehicle and inflatable in the housing, the airbag comprising:
    a front panel;
    a rear panel coupled to the front panel to form an inflation chamber, the rear panel including an uninflated state upper and lower portions defined by a single layer of material and a wrinkle portion, the wrinkle portion disposed between the upper and lower portions and folded so as to be defined by three layers of material; and
    a first tether having a first end secured to the front panel and a second end secured to the rear panel at an innermost layer of the wrinkle portion.

11. The airbag of claim 10, further comprising second and third tethers both having a first end secured to the front panel and a second end secured to the rear panel at the upper portion.

12. The airbag of claim 10, in combination with the housing, the housing defining a corner adjacent an opening thereof, the first tether secured to the front panel at a location proximate the corner when the airbag is deployed.

13. The airbag of claim 10, wherein the front and rear panels are fabricated as one piece such that the front and rear panels face each other about a first folding line, a vertical length from the first folding line to an upper end of the front panel is shorter than a length from the first folding line to an upper end of the rear panel, the front and rear panels include a front inclined end and a rear inclined end, respectively, which are gradually inclined outward from the first folding line to upper ends of the front and rear panels, and the front and rear panels include front and rear flaps protruding outward from the front and rear inclined ends and symmetrical to each other about the first folding line.

14. The airbag of claim 13, wherein the front and rear flaps include:
    lower ends placed in the front and rear panels when the front and rear flaps are folded in a horizontal direction at a position spaced apart from the first folding line; and
    side ends corresponding to the front and rear inclined ends.

15. An airbag for a knee airbag apparatus which is received in a housing coupled to an instrument panel of a vehicle and inflatable in the housing, the airbag comprising:
    a front panel; and
    a rear panel coupled to the front panel to form an inflation chamber,
    wherein the front and rear panels are fabricated as one piece such that the front and rear panels face each other about a first folding line, a vertical length from the first folding line to an upper end of the front panel is shorter than a length from the first folding line to an upper end of the rear panel, the front and rear panels include a front inclined end and a rear inclined end, respectively, which are gradually inclined outward from the first folding line to upper ends of the front and rear panels, and the front and rear panels include front and rear flaps protruding outward from the front and rear inclined ends and symmetrical to each other about the first folding line.

\* \* \* \* \*

UNITED STATES PATENT AND TRADEMARK OFFICE
CERTIFICATE OF CORRECTION

| | | |
|---|---|---|
| PATENT NO. | : 9,669,793 B2 | Page 1 of 1 |
| APPLICATION NO. | : 14/781758 | |
| DATED | : June 6, 2017 | |
| INVENTOR(S) | : Doo Seob Jung and Do-Gwan Kim | |

It is certified that error appears in the above-identified patent and that said Letters Patent is hereby corrected as shown below:

On the Title Page

Assignee: AUTOLIVE DEVELOPMENT AB
Should be: --AUTOLIV DEVELOPMENT AB--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*